Nov. 8, 1932. S. R. SVENDSGAARD 1,887,440
CUTTING DEVICE
Filed Feb. 5, 1932
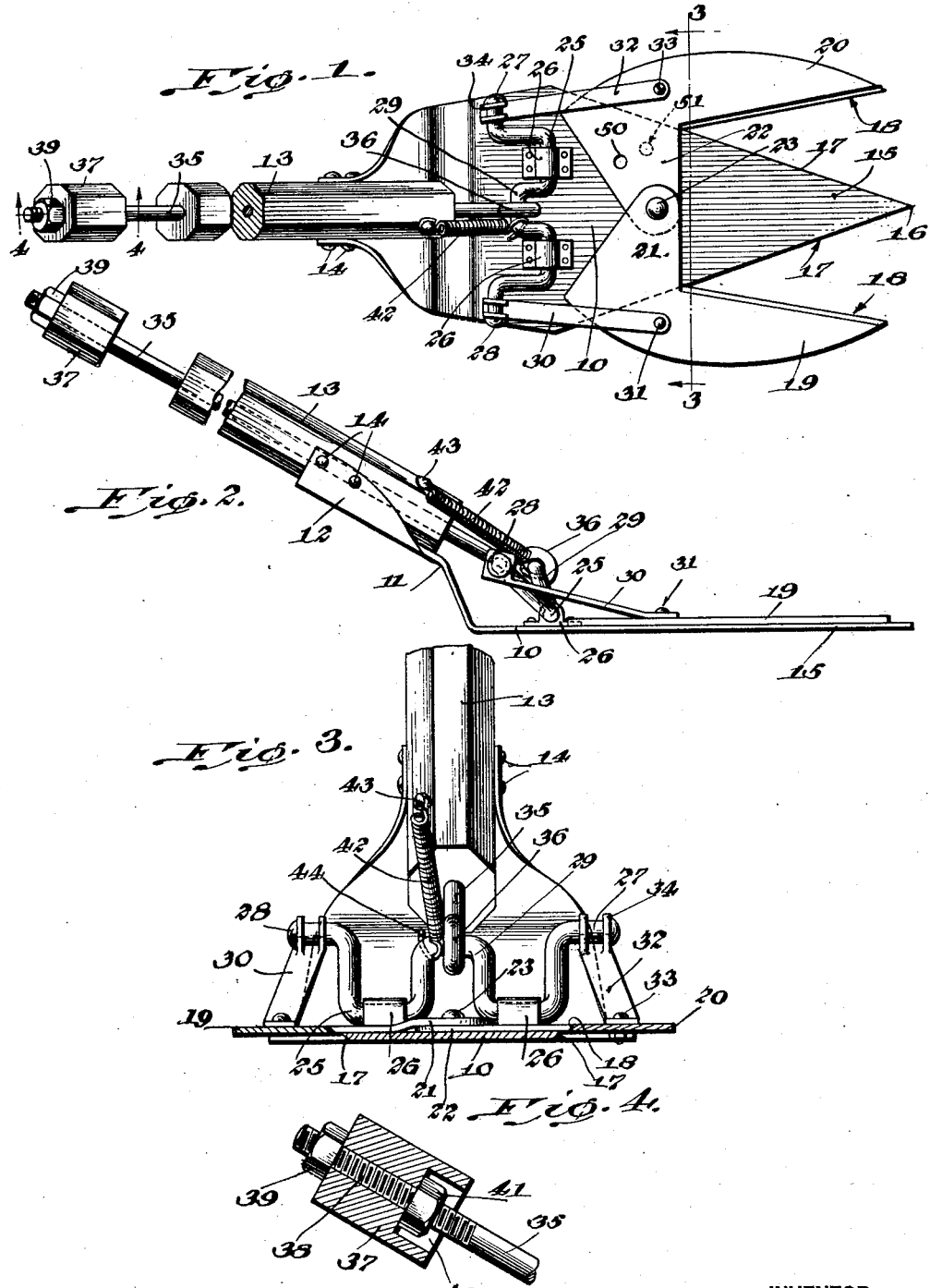
INVENTOR
S. R. Svendsgaard,
BY
ATTORNEY Patented Nov. 8, 1932

1,887,440

UNITED STATES PATENT OFFICE

SVERRE R. SVENDSGAARD, OF MARSHFIELD, OREGON

CUTTING DEVICE

Application filed February 5, 1932. Serial No. 591,149.

This invention relates to a cutting device and is more particularly designed for use as a shears for cutting grass where the usual lawn mower cannot be applied.

An object of the invention is the provision of a cutting device having a base member and a projecting fixed blade with a pair of movable blades having a common pivotal mounting on the base member with the blades movable toward or away from the cutting edge of the fixed blade so that a double cutting action will be had.

Another object of the invention is the provision of a pair of grass shears having a pair of movable blades operatively associated with a fixed blade with means for oscillating the movable blades, said means including a releasable means whereby one of the blades only may be operated so that power exerted for operating both blades may be applied to the single blade when it is desired to do heavier work.

A further object of the invention is the provision of a pair of grass shears having movable blades operating in connection with the fixed blade with a crank shaft rockably mounted on a base member which supports the movable blades, a handle being connected with the base member and having a passage to receive a reciprocating rod which is adapted to be actuated for rocking the crank shaft for causing an oscillation of the movable blades.

This invention will be best understood from a consideration of the following detailed description, in view of the accompanying drawing forming a part of the specification; nevertheless, it is to be understood that the invention is not confined to the disclosure, being susceptible of such changes and modifications which shall define no material departure from the salient features of the invention as expressed in the appended claims.

In the drawing:

Figure 1 is a plan view of a grass shears constructed in accordance with the principles of my invention, Figure 2 is a longitudinal side view of the same, Figure 3 is a transverse vertical section taken along the line 3—3 of Figure 1, and Figure 4 is a vertical section taken along the line 4—4 of Figure 1.

Referring more particularly to the drawing, 10 designates a base member formed of metal which has an angular extension 11 provided with ears 12 adapted to embrace the lower end of a hollow handle 13. Ears are secured at 14 to the handle in any approved manner.

A fixed blade 15 is formed integrally with the base member 10 and is triangularly-shaped with a smaller end or apex 16 forming the outer or terminus of the fixed blade 15. The sides 17 of the blade 15 are provided with knife edges which co-operate with complementary formed knife edges 18 of movable blades 19 and 20.

At the inner ends of the movable blades are formed lugs 21 and 22 respectively on the blades 19 and 20 and a pin 23 provides a pivot for the lugs and likewise the movable blades. This pin is carried by the base member 10. This construction of the integrally formed lugs and the movable blades 19 and 20 provide substantially bell-crank members which may be oscillated towards or away from the knife edges 17 of the fixed blade 15.

A crank shaft 25 is mounted in bearings 26 which are secured to the base member 10. This shaft is provided with similarly disposed cranks 27 and 28 and an intermediate crank 29.

A link 30 pivotally connects the crank 28 with the blade 19 as shown at 31. A link 32 has a pivotal connection 33 with the blade 20 and is pivotally connected at 34 with the crank 27. The pivotal connection 33 is in the form of a bolt and nut for releasably connecting the link 32 with the blade 20 so that when desired this link may be disconnected from the blade 20 and permit the blade 19 to be operated solely by the rocking of the crank shaft 25.

An operating rod 35 is mounted longitudinally of the hollow handle 13 and is provided with an eye 36 connected with the crank 29. This rod extends beyond the handle 13 and is provided with a hand-grip 37 whereby the rod may be reciprocated.

It will be noted in Fig. 4 that the outer end of the rod is threaded, as shown at 38, and is provided with a nut 39 at its outer end engaging the outer end of the hand-grip 37. The inner portion of the hand-grip is provided with a recess 40 adapted to receive a nut 41 threaded on the outer end of the rod 45. These nuts secure the hand-grip member in position on the rod 35.

A coil spring 42 is connected at 43 with a hande 13. The other end of the spring, as shown at 44, is connected to the crank member 29.

The operation of my device is as follows: When the rod 35 is reciprocated through the hand-grip member 37, the crank shaft 25 will be rocked so that the links 30 and 32 will be reciprocated, thereby causing oscillation of the movable blades 19 and 20 on their common pivot 23. This will move the cutting edges of the blades 19 and 20 into operative relation with the cutting edges 17 of the fixed blade 15. The spring 36 will at all times tend to rock the crank shaft 25 and thus move the cutting blades 19 and 20 into an open or an inoperative position with respect to the fixed blade 15.

If it be desired at any time to employ the blade 19 for cutting purposes, it will only be necessary to release the pivot pin 33 from the blade 20 so that the force applied to the reciprocating rod 35 may be expended upon the operation of the single blade. It will be seen that the double shears may be operated as a single cutting device or as a double operating mechanism.

In order to retain the blade 20 stationary when bolt 33 is removed from its normal position the bolt is inserted in the opening 50 of the blade 20 and the opening 51 in the base member 10. When this is done the movable blade 20 will be in close association with the fixed blade 15.

I claim:

1. A cutting device comprising a base member having a stationary blade projecting therefrom, the opposite sides of the blade being provided with a knife edge, a pair of movable blades located upon the opposite sides of the stationary blade and having inwardly projecting lugs, a common pivot for the lugs carried by the stationary blade, means for oscillating the movable blades into operative relation with the knife edge of the stationary blade, and a spring for returning the movable blades to an inoperative position.

2. A cutting device comprising a base member having a stationary blade projecting therefrom, the opposite sides of the blade being provided with a knife edge, a pair of movable blades located upon the opposite sides of the stationary blade and having inwardly projecting lugs, a common pivot for the lugs carried by the stationary blade, a crank shaft rotatably mounted on the base member and provided with a plurality of cranks, a link connecting a movable blade with a crank, an operating rod connected with a crank so that the cranf shaft may be manually rocked, and a spring for returning the movable blades to an inoperative position.

3. A cutting device comprising a base member having a stationary blade projecting therefrom, the opposite sides of the blade being provided with a knife edge, a pair of movable blades located upon the opposite sides of the stationary blade and having inwardly projecting lugs, a common pivot for the lugs carried by the stationary blade, a crank shaft rotatably mounted on the base member and provided with a plurality of cranks, a link connecting a movable blade with a crank, an operating rod connected with a crank so that the crank shaft may be manually rocked, and a spring for returning the movable blades to an inoperative position, one of said links being removably connected to its respective blade so that said blade may be released when it is desired to employ but a single blade.

4. A cutting device comprising a base member having a stationary blade projecting therefrom, the opposite sides of the blade being provided with a knife edge, a pair of movable blades located upon the opposite sides of the stationary blade and having inwardly projecting lugs, a common pivot for the lugs carried by the stationary blade, means for oscillating both of the blades simultaneously, said last-mentioned means including releasable means for one of the movable blades so that the other blade may be operated solely.

5. A cutting device comprising a base member having a stationary blade, a pair of movable blades pivotally mounted on the base member and adapted to be moved into operative relation with the stationary blade, a hollow handle connected with the base member, an operating rod mounted for reciprocation in the hollow handle, rockable means on the base member having pivotal connection with the operating rod, and means connecting the rockable means with the movable blades.

SVERRE R. SVENDSGAARD.